United States Patent [19]

Lemstra et al.

[11] Patent Number: 4,668,717
[45] Date of Patent: May 26, 1987

[54] PROCESS FOR THE CONTINUOUS PREPARATION OF HOMOGENEOUS SOLUTIONS OF HIGH MOLECULAR POLYMERS

[75] Inventors: Pieter J. Lemstra, Brunssum; Henricus E. H. Meijer, Obbicht; Lambert H. T. van Unen, Heerlen, all of Netherlands

[73] Assignee: Stamicarbon B.V., Geleen, Netherlands

[21] Appl. No.: 812,990

[22] Filed: Dec. 24, 1985

Related U.S. Application Data

[63] Continuation-in-part of Ser. No. 704,998, Feb. 25, 1985.

[30] Foreign Application Priority Data

| Sep. 28, 1984 | [NL] | Netherlands | 8402962 |
| Sep. 29, 1984 | [NL] | Netherlands | 8402961 |
| Feb. 15, 1985 | [NL] | Netherlands | 8500428 |
| Feb. 15, 1985 | [NL] | Netherlands | 8500429 |
| Oct. 9, 1985 | [IN] | India | 711/MAS/85 |

[51] Int. Cl.$^4$ .............................................. C08J 3/08
[52] U.S. Cl. .................................................. 523/322
[58] Field of Search ........................................ 523/322

[56] References Cited

U.S. PATENT DOCUMENTS

| 3,665,068 | 5/1972 | Dulung et al. | 524/477 |
| 3,812,062 | 5/1974 | Tatzel et al. | 521/143 |
| 3,887,319 | 6/1975 | Cottingham | 425/207 |
| 3,959,197 | 5/1976 | Salyer et al. | 521/146 |
| 4,137,394 | 1/1979 | Meihuizen et al. | 526/352 |
| 4,344,908 | 8/1982 | Smith et al. | 264/203 |
| 4,413,110 | 11/1983 | Kavesh et al. | 524/108 |
| 4,430,383 | 2/1984 | Smith et al. | 264/210.8 |
| 4,436,689 | 3/1984 | Smith et al. | 264/205 |

*Primary Examiner*—Joseph L. Schofer
*Assistant Examiner*—N. Sarofim
*Attorney, Agent, or Firm*—Cushman, Darby & Cushman

[57] ABSTRACT

A continuous process is described wherein suspensions of high molecular weight polymers are readily transformed into solutions thereof for extrusion, to make gel filaments, tapes, tubes and films, by use of an extruder having alternate mixing and transporting sections and operating at mechanical shear rates of from 30 to 2,000 sec.$^{-1}$, and with relatively short residence times therein.

14 Claims, No Drawings

PROCESS FOR THE CONTINUOUS PREPARATION OF HOMOGENEOUS SOLUTIONS OF HIGH MOLECULAR POLYMERS

This application is a continuation-in-part application of Ser. No. 704,998, filed Feb. 25, 1985.

This invention relates to a novel process for the continuous preparation of homogeneous solutions of high-molecular weight polymers and of homogeneous gel articles therefrom from suspensions of finely divided high-molecular weight polymer in a suitable solvent, and at up to relatively high concentrations and in relatively very short required times.

BACKGROUND OF THE INVENTION

The production of polymer articles, particularly filaments and ribbons, having very high tensile strength and modulus, from solutions of high molecular weight polymers, specifically high molecular weight linear polyethylene, has now been described in a number of patents. See, for instance, U.S. Pat. Nos. 4,344,908; 4,411,845; 4,422,993; 4,430,383; and 4,436,689. Also see U.S. Pat No. 4,137,394.

Generally speaking, in these known processes, a solution having a concentration of at most about 20 wt.% of a high molecular weight polymer is spun or extruded through an aperture, either round or slit-shaped, to form a filament or ribbon. This filament or ribbon can be subsequently converted to form a gel-state filament or ribbon by cooling to a temperature below the gel point. Thereafter, such gel filament or ribbon may be stretched or drawn at an elevated temperature, either with or without first removing all or part of the solvent.

It has also been recognized that in such techniques it is very important that the polymer solutions used be homogeneous; in the absence of a high level of homogeneity the quality of the filaments or ribbons, and the drawability or stretchability in the gel state, will be seriously adversely affected, and indeed will be erratic over the length of the formed material.

Typically, in the past, such solutions of the polymer have been prepared by stirring the high molecular weight polymer in a suitable solvent to form the solution. It has been recognized, however, that to form such solutions is not an easy task, and becomes rather time-consuming. This is partially due to the fact that when working with the very high molecular weight polymer materials involved (for instance, polyethylene having a weight average molecular weight of at least $4 \times 10^5$, or especially above about $8 \times 10^5$) the mechanical forces applied during the stirring operation tend to elongate the normally coiled polymer molecules. As a result of this effect a retractive force is created by which the molecule seeks to retract itself into a coil again. The ultimate observed result in the practice of the conventional stirring techniques is that the high molecular weight polymer molecules will tend to gather around the center of the stirring rod, or other device, and to climb up against the stirring rod or device itself. This has been described in the literature as the so-called Weissenberg effect.

This effect, which is indigenous to the ordinary stirring of these high molecular weight polymers thus creates a major problem in attempting to form homogeneous solutions thereof. The Weissenberg effect is enhanced as the solutions are more vigorously or rapidly stirred, and as the polymer concentration is increased and as the molecular weight of the polymer in increased. It will be understood that under conditions such that the Weissenberg effect manifests itself, non-homogeneous polymer solutions result, with deleterious effects on the properties of the gel spun filaments, ribbons, or films.

Effectively, homogeneous solutions can only be prepared by these techniques if very slow stirring rates are employed, and if relatively dilute solutions of the polymer are used. It will also be appreciated that as the solution concentration increases, the solutions take on extremely high viscosity characteristics. Under these circumstances, stirring becomes more arduous and moreover it becomes increasingly difficult thereafter to feed and deliver the highly viscous solutions to a spinning head or to a conventional extrusion device to form the gel filament or tape.

A further disadvantage is that as the time for stirring increases, which is required when slow stirring speeds must be employed, the difficulty occurs that degradation of the polymer molecules will result unless extreme precautions are taken to exclude the presence of oxygen.

Further, because of the corresponding effect of a viscosity increase the process also becomes increasingly difficult as the molecular weight of the plymer molecules increases.

These problems have variously been recognized in the prior art as is illustrated by U.S. Pat. No. 4,137,394 which effectively discusses the slow rate of crystallization and consequently the slow rate of stirring required, for that process. Further, in U.S. Pat. No. 4,413,110, there is described a process for suspending high molecular weight polyolefins in paraffinic oil, wherein it is indicated that the suspension must be slowly stirred at elevated temperatures for many hours. These are precisely the conditions under which degradation of the polymer, and also segregation of polymer molecules of differing molecular weights, may occur, absent special precautions, so that, again, homogeneous solutions are not readily obtained.

There are, accordingly, numerous disadvantages to the presently known procedures for preparing these high molecular weight solutions and with respect to their spinning or extrusion through an orifice or aperture. The problems are such that high costs are involved, particularly when the fundamental process is attempted to be applied on a large, commercial scale, and it also becomes extremely difficult to carry out the known processes in a continuous, as opposed to a batch, procedure.

SUMMARY OF THE INVENTION

The present invention now provides an improved novel process wherein, and surprisingly so in view of the teachings appearing in the prior art, a technique has been found whereby homogeneous solutions of high molecular weight polymers may readily be obtained while substantially avoiding the above-discussed problems, and in relatively short times such that hardly any, if any at all, polymer degradation or segregation occurs, and by which it is also possible to prepare and handle relatively highly concentrated solutions of such polymers, and even with high molecular weight polymers.

In summary, this invention provides a novel process for the continuous preparation of homogeneous solutions of high molecular weight polymers, particularly polyethylene wherein a suspension of the finely divided high molecular weight polymer is formed in a suitable solvent or mixture of solvents which solvent(s) is (are) liquid at room temperature, and wherein the resulting suspension is passed through a extruder device equipped with both mixing and conveying parts or sections, preferably alternating, and operating at rotational speeds from about 30 to about 300 revolutions per minute, within such periods of time (t) that (t) expressed in minutes is at most 0.3 D, wherein D denotes the diameter of the extruder in millimeters, and at temperatures from above the dissolution temperature of said polymer in said solvents(s) up to about to boiling point of the solvent(s) (at the prevailing operating pressure), and with a mixing treatment providing a mechanical shear rate of between 30 and 2000 sec.$^{-1}$, the desired homogeneous high molecular weight polymer solutions are formed which can then be readily extruded through an aperture to form filaments, ribbons, tapes, and film-dimensioned or even tubular extrudates.

This novel process is surprisingly effective, and is contrary to existing teaching in the prior art. For instance, recent European patent application No. 0115192, of Mitsui Petrochemicals Industries Limited, states at page 3 that continuous extrusion spinning from a screw extruder is 'practically impossible', particularly where a suspension of solvent and powdered polyethylene are employed. The reason given is the excessively great difference in viscosity between the solvent and the polymer powder. Moreover, the same text indicates at page 3, lines 23-27, that even if extrusion can be effected with the polymer in a liquid (at operating conditions) paraffin solvent: the extrudate (e.g. filament, tape or film) cannot be stretched at all because it is not a uniform mixture. Further, it is impossible to perform melt extrusion spinning continuously by a screw extruder."

As demonstrated below, however, the process of the present invention rather remarkably achieves exactly the result which the art believed to be "impossible".

Moreover, it has been found in the present invention that the feed to the extruder may be either an already formed suspension of the polymer powders in the solvent, or, alternatively, separate feed streams of the solvent on the one hand and polymer powder on the other hand may be used with the formation of the suspension, followed by its transformation into a homogeneous solution, all actually occuring within the twin-screw extruder device itself.

Even though very high rotational speeds are used in the extruder in the practice of this invention, the above-discussed "Weissenberg effect" is nonetheless effectively controlled, so that homogeneous solutions result and the same may now be readily extruded through an aperture or orifice of the desired shape and dimensions at the exit end of the extruder to yield useful, readily drawable extrudates of desirably uniform characteristics.

DETAILED DESCRIPTION OF THE INVENTION

The present process can in principle be generally applied for the preparation of solutions of a variety of high-molecular weight polymers, such as polyolefins, polyamides, polyvinylalcohol, polyacrylonitrile or mixtures of these.

The process is particularly suitable for the preparation of homogeneous solutions of linear polyethylene having a weight-average molecular weight of at least $4 \times 10^5$, preferably of at least $5 \times 10^5$ and most preferably of at least $8 \times 10^5$. High-molecular weight linear polyethylene is here understood to mean polyethylene that may contain minor amounts, preferably at most 5 mol %, of one or more other alkenes copolymerized therewith, such as propylene, butylene, pentene, hexene, 4-methylpentene, octene, etc., with at least 100 linear chain carbon atoms and preferably at least 300 linear chain carbon atoms between any side chains, especially side chains having more than one carbon atom. The polyethylene may contain minor amounts, preferably at most 25 wt %, of one or more other polymers, in particular an alkene-1-polymer such as polypropylene, polybutylene or a copolymer of propylene with a minor amount of ethylene.

The polyethylene may also contain substantial amounts of fillers as described in U.S. Pat. No. 4,411,854. It may also be an advantage to use a polyethylene whose weight-average/number-average molecular weight ratio is below 5, as described in U.S. Pat. No. 4,436,689.

Since even in this present process the viscosity of the solution formed increases as the molecular weight of the polyethylene increases, so that the solutions become more difficult to process, generally polyethylene with molecular weights of more than $15 \times 10^6$ will not be used, although indeed the present process is operable with such and even high molecular weights. The weight-average molecular weights referred to herein can be determined according to already known methods such as gel permeation chromatography and light scattering.

This process is also very suitable for preparing homogeneous solutions of high-molecular weight polypropylene, particularly of polypropylene with a weight-average molecular weight of more than $25 \times 10^4$, and preferably of at least $5 \times 10^5$.

The present process can also be used for preparing solutions of high-molecular weight polyamides, such as are prepared from lactams, particularly caprolactam, by anionic polymerization, having a weight-average molecular weight of at least $2 \times 10^5$ and also high-molecular weight polyvinylalcohol, particularly having a weight-average molecular weight of at least $0.5 \times 10^5$.

The process is further particularly suitable for preparing homogeneous solutions of polyacrylonitrile having a weight-average molecular weight of at least $3 \times 10^5$, specifically of $5 \times 10^5$ to $5 \times 10^6$. Such a polyacrylonitrile can be obtained in a manner already known per se, for instance by free radical polymerization in emulsion or in solution. When here and elsewhere in the present application the term polyacrylonitrile is used, it is understood to refer to homopolymers of acrylonitrile as well as a copolymer of acrylonitrile with minor amounts, for instance up to 15 wt.%, of monomers compatible therewith, such a methacrylates, acrylates, vinylacetate.

The concentration of polymer in the solution may vary, depending in part on the nature of the solvent, the molecular weight and type of the polymer and the desired use of the prepared solution. For the preparation of filaments and ribbons via the so-called gel-spinning method solutions with concentrations between 1 and 40 wt.%, specifically from 2 to 30 wt.%, will generally be used, while for other uses solutions having concentrations up to 50 wt.% may be desirable.

The choice of the solvent is itself not critical. Any suitable solvent which is liquid at room temperature and in which the polymer is readily soluble at higher temperatures, preferably temperatures above the dissolution temperature, can be used. Of course, a mixture of suitable solvents can be applied too. In the preparation of solutions of polyolefins, particularly polyethylene, generally a halogenated or non-halogenated hydrocarbon will be used, such as paraffins, toluene, xylene, monochlorobenzene, nonane, decane, undecane, dodecane, tetralin, decalin or petroleum fractions with corresponding boiling ranges. In the preparation of solutions of polyacrylonitrile the solvents used will generally be substances capable of eliminating intermolecular dipole-dipole ineractions, such as dimethylformamide, dimethylacetamide, dimethylsulfoxide or ethylenecarbonate. In preparing solutions of polyamides the solvent used may be, inter alia, benzylalcohol, while it is an advantage to use dimethylsulfoxide, glycol or glycerol as solvent for high-molecular polyvinylalcohol.

In the present invention the transformation of the polymer suspension into a homogeneous solution should take place at above about a minimum temperature generally equal to the so-called dissolution temperature (whereat a clear solution will be observed) for the particular polymer-solvent combination used, e.g. at least about 90° C. in the case of polyethylene. This temperature must, however, be lower than the temperature at which substantial thermal decomposition of the polymer occurs. The selected temperature will generally also be below the boiling point of the solvent at the prevailing operating pressure in the equipment. In particular, a temperature between about 140° and 220° C. may generally be employed, depending on the solvent used.

In the process according to this invention the suspension is subjected to a mixing and kneading treatment at high mechanical shear rates in the mixing sections of the extruder employed, i.e. the suspension is exposed to the action of a mixing section in an extruder, provided with one ore more screws. Preference is given to the use of a twin-screw extruder provided with alternate conveying and mixing sections. However, it is also possible to use single-screw extruders if the same are provided with both mixing and conveying sections and which preferably have a grooved wall and conveying pins.

In order to achieve a high shear rate and a short residence time, the rotational speed of the extruder screws must be rather high. With a twin-screw extruder this must generally be more than 30, for instance about 150–300, and preferably about 200, revolutions per minute. The speed of rotation should be such that mechanical shear rates of between 30 and 2,000 sec$^{-1}$, advantageously from 100 to 300 sec$^{-1}$ are achieved.

In the practice of the present invention it has also been found that effective production of homogeneous solutions can be achieved with very short mixing times. The time required for the transformation from suspension to homogeneous solution will be less than (0.3 D) minutes, wherein D denotes the diameter of said extruder in millimeters. Preferably said time is less than (0.2 D) minutes and even below (0.1 D) minutes. Generally said time will be less than 60 minutes, advantageously less than 30 minutes and specifically 20 minutes at most, this for a (semi) commercial extruder.

Within the stated principles and parameters for this invention, a person skilled in the art will now be able to select an appropriately designed and dimensional twin- or single-screw extruder to practice this process.

The solutions thus obtained by this invention can be used for various purposes. In particular they are suitable to be processed via thermo-reversible gelling and stretching into ultrastrong polymer articles, such as fibers, ribbons, bands, tapes, and films etc. In so doing, it is highly advantageous to install a gear pump at the exit end of the extruder for purposes of metering the flow therefrom to the aperture or orifice of the spinning head, or equivalent device.

The invention will now be further elucidated in the following examples without, however, being limited thereto.

EXAMPLE I

A high-molecular weight polyethylene of the grade Hifax-1900 (Hercules) with a weight-average molecular weight $M_w$ of about $2 \times 10^6$ ($\eta$ decalin, 135° C.–18.5°; Fliesswert N/mm$^2$–0.32) was suspended in decalin to a nominal concentration of 5 wt.% at room temperature. After deaeration and washing with nitrogen and addition of a stabilizer composition the suspension was fed to an extruder while being stirred continuously (in order to prevent settling of the suspension). A co-rotating twin screw-extruder of the ZSK type of the firm of Werner and Pfleiderer was used; diameter 30 mm; L/D ratio=27. This extruder had 2×30 mm screws composed of alternating conveying and mixing elements. The suspension was supplied at room temperature to the feed zone, the thermostat temperature of which was set to about 80° C. The suspension of polyethylene in decalin was then extruded at about 180° C. (head temperature) at a screw speed of 200 rpm corresponding with an overall residence time in the extruder of about 3 minutes.

Under the above conditions the process produced a clear solution free of suspended particles, having a constant homogeneous composition and concentration.

EXAMPLE II

In the same way as in example I, a 3 wt.% suspension of Hifax-1900 in paraffin was extruded at 180° C., a screw speed of 140 rpm and a residence time of about 4 minutes.

A homogeneous, clear solution was obtained.

EXAMPLE III

In the same way as in example I a 15 wt.% suspension of a high-molecular weight polyethylene of the grade Hostalen GUR 412 (Ruhrchemie/Hoechst) with a weight-average molecular weight of about $1.5 \times 10^6$ ($\eta$ decalin, 135° C.=15: Fliesswert=0.24 N/mm$^2$) in decalin was extruded at 180° C., a screw speed of 180 rpm and an extruder residence time of about 3 minutes.

A homogeneous, clear solution was obtained.

EXAMPLES IV–XXX

In the same way as in Example I, various suspensions of high-molecular weight polyethylenes in solvents were transformed into homogeneous clear solutions. The results are summarized in Table 1. (Hizex 240 M is a type of polyethylene of the firm Mitsui Petrochemicals with a weight-average molecular weight of about $1.9 \times 10^6$ ($\eta$ decalin, 135° C.=15.5, Fliesswert=0.30 N/mm$^2$).)

TABLE 1

| Example No. | Polymer | Solvent | Concentration of solution wt. % | Extruder Temperature °C. | Extruder Speed r.p.m. |
| --- | --- | --- | --- | --- | --- |
| I | Hifax-1900 | Decalin | 5 | 180 | 200 |
| II | Hifax-1900 | Paraffin | 3 | 180 | 140 |
| III | Hostalen GUR 412 | Decalin | 15 | 180 | 180 |
| IV | Hifax-1900 | Decalin | 10 | 200 | 210 |
| VI | Hifax-1900 | Decalin | 15 | 195 | 160 |
| VII | Hifax-1900 | Decalin | 20 | 200 | 170 |
| VIII | Hifax-1900 | Decalin | 10 | 190 | 100 |
| IX | Hifax-1900 | Paraffin | 8 | 185 | 60 |
| X | Hostalen GUR 412 | Paraffin | 5 | 200 | 50 |
| XI | Hostalen GUR 412 | Paraffin | 5 | 200 | 35 |
| XII | Hostalen GUR 412 | Paraffin | 3 | 200 | 100 |
| XIII | Hostalen GUR 412 | Paraffin | 3 | 200 | 300 |
| XIV | Hostalen GUR 412 | Decalin | 3 | 180 | 250 |
| XV | Hostalen GUR 412 | Decalin | 3 | 180 | 300 |
| XVI | Hostalen GUR 412 | Decalin | 3 | 180 | 100 |
| XVII | Hostalen GUR 412 | Decalin | 3 | 180 | 30 |
| XVIII | Hizex 240 M | Paraffin | 7 | 200 | 150 |
| XIX | Hizex 240 M | Paraffin | 7 | 200 | 200 |
| XX | Hizex 240 M | Decalin | 5 | 180 | 100 |
| XXI | Hizex 240 M | Decalin | 5 | 180 | 220 |
| XXII | Hizex 240 M | Decalin | 7 | 180 | 180 |
| XXIII | Hizex 240 M | Decalin | 3 | 250 | 280 |
| XXIV | Hizex 240 M | Paraffin | 5 | 200 | 60 |
| XXV | Hizex 240 M | Paraffin | 5 | 200 | 100 |
| XXVI | Hizex 240 M | Paraffin | 5 | 200 | 200 |
| XXVII | Hostalen GUR 412 | Decalin | 15 | 180 | 150 |
| XXVIII | Hifax-1900 | Decalin | 20 | 200 | 80 |
| XXIX | Hifax-1900 | Decalin | 20 | 200 | 100 |
| XXX | Hifax-1900 | Decalin | 20 | 200 | 200 |

EXAMPLES XXXI-XXXV

A number of solutions obtained according to the invention were transformed into filaments by processing the solution through a spinning aperture (1 mm), quenching with water and extraction with dichloromethane, followed by single step stretching or drawing at 120° C. In that process gel filaments of very high stretchability and product filaments having very high modulus and tensile strength were obtained. The results are summarized in Table II which clearly demonstrates the excellent homogeneity of the solutions according to the invention.

The transporting behaviour, the mixing and the kneading of the material, the viscosity of which increases (difference in viscosity between the suspension and the solution is e.g. in the magnitude of a factor 1000)depends inter alia on the polymer and the solvent used, the concentration applied, the screw design and the speed of the extruder. Particularly for filament production, it is advantageous to insert between the extruder and the shaping or spinning head a gear pump, which guarantees a continuous yield of adjusting the residence time independently of the selected polymer, solvent, concentration, screw design and speed (r.p.m.) of the extruder.

TABLE II

| Example No. | Polymer | Concentration Solution | Solvent | Speed Extruder in r.p.m. | Residence time in extruder in min. | Draw ratio 120° C. | Tensile strength in GPa | Modulus in GPa |
| --- | --- | --- | --- | --- | --- | --- | --- | --- |
| XXXI | Hostalen GUR 412 | 3% | Decalin | 30 | 18 | 40 | 1.2-1.5 | 30-37 |
| XXXII | Hostalen GUR 412 | 3% | Decalin | 100 | 7 | 60 | 2.1-2.4 | 50-55 |
| XXXIII | Hostalen GUR 412 | 3% | Decalin | 200 | 3 | 60 | 2.4-2.8 | 70-80 |
| XXXIV | Hostalen GUR 412 | 3% | Decalin | 300 | 3 | 45 | 3.1-2.4 | 60-70 |
| XXXV | Hifax-1900 | 3% | Paraffine | 200 | 9 | 67 | 2.0-2.2 | 60-70 |

EXAMPLES XXXVI-LXXXII

A number of solutions obtained according to the invention were transformed into filaments in the manner described in Examples XXXI-XXXV except that between the extruder and aperture a gear pump was installed, of type Feinpruf 2×0.9. The gel filaments thereby obtained show very high drawability and the product show very high drawability and the product filaments possess very high modulus and strength properties even after only a one step drawing, this over a very broad range of speed and with very short residence times. The results are summarized in Table III.

TABLE III

| Example No. | Polymer | Concentration of solution in wt. % | Solvent | Speed Extruder in r.p.m. | Residence time in extruder in min. | Draw ratio 120° C. | Tensile strength in GPa | Modulus in GPa |
|---|---|---|---|---|---|---|---|---|
| XXXVI | Hizex 240 M | 3 | Decalin | 30 | 12 | 48 | 2.2 | 97 |
| XXXVII | " | | | 100 | 12 | 46 | 2.3 | 85 |
| XXXVIII | " | | | 200 | 12 | 50 | 2.3 | 95 |
| XXXIX | " | | | 300 | 12 | 43 | 2.6 | 80 |
| XL | Hizex 240 M | 3 | Decalin | 30 | 6 | 60 | 2.4 | 80 |
| | " | | | 100 | 6 | 50 | 2.7 | 95 |
| | " | | | 200 | 6 | 52 | 2.6 | 90 |
| | " | | | 300 | 6 | 50 | 2.4 | 80 |
| XLIV | Hizex 240 M | 3 | Decalin | 30 | 3,3 | 40 | 2.1 | 85 |
| XLV | " | | | 100 | 3,3 | 55 | 2.6 | 85 |
| XLVI | " | | | 200 | 3,3 | 55 | 2.7 | 90 |
| XLVII | " | | | 300 | 3,3 | 58 | 2.4 | 90 |
| XLVIII | Hizex 240 M | 3 | Decalin | 100 | 2,1 | 52 | 2.3 | 90 |
| XLIX | " | | | 200 | 2,1 | 55 | 2.6 | 95 |
| L | " | | | 300 | 2,1 | 52 | 3.2 | 95 |
| LI | Hifax 1900 | 3 | Decalin | 100 | 12 | 35 | 1.7 | 75 |
| LII | IV = 18 | | | 200 | 12 | 55 | 2.4 | 80 |
| LIII | " | | | 300 | 12 | 57 | 2.7 | 85 |
| LIV | Hifax 1900 | 3 | Decalin | 30 | 6 | 52 | 2.7 | 90 |
| LV | " | | | 100 | 6 | 52 | 2.7 | 85 |
| LVI | " | | | 300 | 6 | 49 | 2.5 | 80 |
| LVII | Hifax 1900 | 3 | Decalin | 30 | 3,3 | 55 | 2.1 | 80 |
| LVIII | " | | | 100 | 3,3 | 43 | 2.3 | 75 |
| LIX | " | | | 300 | 3,3 | 50 | 2.2 | 75 |
| LX | Hifax 1900 | 3 | Decalin | 100 | 2,1 | 64 | 1.4 | 80 |
| LXI | " | | | 200 | 2,1 | 52 | 2.1 | 75 |
| LXII | " | | | 300 | 2,1 | 43 | 1.9 | 85 |
| LXIII | Hizex 240 M | 5 | Decalin | 30 | 12 | 41 | 2.9 | 65 |
| LXIX | " | | | 100 | 12 | 45 | 2.5 | 80 |
| | | | | 300 | 12 | 47 | 1.9 | 75 |
| LXXII | Hizex 240 M | 5 | Decalin | 30 | 6 | 44 | 1.7 | 50 |
| LXXIII | " | | | 100 | 6 | 42 | 2.0 | 50 |
| LXXIV | " | | | 200 | 6 | 40 | 1.4 | 65 |
| LXXV | " | | | 300 | 6 | 40 | 1.9 | 45 |
| LXXVI | Hizex 240 M | 5 | Decalin | 30 | 3,3 | 45 | 1.9 | 60 |
| LXXVII | " | | | 100 | 3,3 | 44 | 1.8 | 60 |
| LXXVIII | " | | | 200 | 3,3 | 43 | 2.3 | 50 |
| LXXIX | " | | | 300 | 3,3 | 48 | 2.0 | 65 |
| LXXX | Hizex 240 M | 5 | Decalin | 100 | 2,1 | 48 | 1.7 | 60 |
| LXXXI | " | | | 200 | 2,1 | 37 | 1.9 | 35 |
| LXXXII | " | | | 300 | 2,1 | 38 | 1.7 | 40 |

EXAMPLE LXXXIII

To the feed zone of a co-rotating twin-screw extruder, the thermostated temperature of which zone was set at 80° C., a finely divided ($\delta_{50}=90$ μm), high-molecular polyethylene of the Hostalen GUR 412 grade (of the firm Ruhrchemie/Hoechst) with a weight-average molecular weight of about $1.5 \times 10^6$ and decalin were supplied at a polyethylene: decalin weight ratio of about 1:30. The extruder used was of the ZSK type, of the firm of Werner and Pfleiderer, L/D=27, provided with 2×30 mm screws composed of alternate conveying and mixing elements. The temperature in the extruder was 170°–180° C., the speed was about 220 revolutions per minute.

After a residence time of 2.7 minutes the mixture obtained was carried off via an aperture (diameter 1 mm) at the other end of the extruder and into a water bath, by which operation a solvent-containing gel filament was obtained having a homogeneous structure, which gel filament was found to be extremely suitable to be transformed via ultra-high drawing (single-step, 60×) to form a filament with a very high modulus (80 GPa) and tensile strength (2.8 GPa).

EXAMPLE LXXXIV

The process of example XXXVI was repeated, however using extruder speeds of 30, 100 and 300 revolutions per minute and residence times of, respectively, 18, 7 and 3 minutes. The gel filaments thereby obtained were of a very homogeneous structure and could be converted via stretching at high draw ratios (40× to 60×) into filaments with high tensile strengths (1.5 to 2.4 GPa) and moduli (37–70 GPa).

EXAMPLE LXXXV

The process of example XXXVI was repeated using an approximately 3 wt.% suspension of Hostalen GUR 412 in decalin prepared in a stirring flask and being metered to the feed zone of the extruder.

The results were the same as those of Example I.

EXAMPLE LXXXVI

In the same way as in example XXXVIII a 3 wt.% suspension of a polyethylene of the Hifax-1900 grade (of the firm of Hercules), with a weight-average molecular weight of about $2 \times 10^6$, in paraffin was fed to the extruder operating at a speed of 200 revolutions per minute and a residence time of 9 minutes.

After quenching in a water bath a very homogeneous gel filament was obtained. The filament was passed through an extraction bath of dichloromethane and was found to be capable of being subjected to ultra-high stretching (about 54×), from which stretching operation filaments having a tensile strength of about 2.1 GPa and a modulus of about 70 GPa were obtained.

EXAMPLE LXXXVII

The process of example XXXIX was repeated except that this time the outlet of the extruder was a slit (2×20 mm).

After quenching a ribbon-shaped gel was obtained, which could be stretched after extraction (draw ratio >60×) to form an extremely thin (<0.5 mm), very strong ribbon (tensile strength and modulus about 2.0–2.2 GPa, and 60–70 GPa respectively).

EXAMPLE LXXXVIII–LXXXIX

The process of example LXXXVII was repeated, except that suspensions of Hifax-1900 in decalin were used with concentrations of 10, 15 and 20 wt.%, respectively, a temperature of 200° C. being maintained in the extruder.

After quenching, gel ribbons were obtained having a very homogeneous gel structure, which ribbons could be subjected to ultra-high stretching (40–70×).

EXAMPLE LXXXX

The process of example LXXXIX was repeated with a suspension of Hifax-1900 in decalin at 15 wt.%. The mixture leaving the extruder was then poured out onto a cooling roll to form a gel film having a thickness of 2 mm and a width of 100 mm. This film was found to have a very homogeneous gel structure and could be transformed via stretching (about 25×) into an extremely thin, very strong film.

EXAMPLE LXXXXI

The process of example LXXXX was repeated, except that a finely divided ($\delta_{50}$=120 μm) suspension of Hifax-1900 in decalin, at a weight ratio of 1:4 was fed to the feed zone of the extruder.

The results were equivalent to those of example LXXXX.

EXAMPLES LXXXXII–LXXXXVI

A number of solutions obtained according to the invention were transformed into filaments in the manner described in examples XXXVI–LXXXII, except that a two-step stretching at 120° C. and 140° C. was applied.

The polymer used (Hizex 145 M) is a polyethylene of the firm Mitsui Petrochemicals with a weight-average molecular weight of $1.06 \times 10^6$ and an intrinsic viscosity of about 8.2. As solvent use was made of decaline. The rotational speed of the extruder was about 160 rpm; the residence time in the extruder amounted to about 3 minutes.

The results are summarized in Table IV.

TABLE IV

| Example | Concentration of solution (wt. %) | Tensile strength (GPa) | Modulus (GPa) | titer (dtex) |
|---|---|---|---|---|
| LXXXXII | 3.3 | 1.7 | 85 | 6 |
| LXXXXIII | 6.4 | 2.0 | 65 | 20 |
| LXXXXIV | 10.3 | 1.9 | 60 | 30–200 |
| LXXXXV | 25.6 | 2.3 | 70 | 6 |
| LXXXXVI | 31.5 | 2.3 | 70 | 6–50 |

EXAMPLES LXXXXVII–C

A number of solutions obtained according to the invention were transformed into filaments via a two-step stretching as described in Examples LXXXXII–LXXXXVI. The solvent used was decaline.

The results are summarized in Table V.

TABLE V

| Example | Polymer | Concentration solution wt. % | Extruder speed rpm | Residence time in extruder min. | tensile strength (after 1st stretching) GPa | modulus (after 1st stretching) GPa | tensile strength (after 2nd stretching) GPa | modulus (after 2nd stretching) GPa |
|---|---|---|---|---|---|---|---|---|
| LXXXXVII | Hifax 1900 (IV 18) | 5 | 200 | 6 | 1.7 | 75 | 2.7 | |
| LXXXXVIII | Hifax 1900 (IV 30) | 3 | 30 | 12 | 1.8 | 70 | 2.8 | 140 |
| IC | Hifax 1900 (IV 30) | 3 | 100 | 12 | 2.0 | 75 | 2.9 | 125 |
| C | Hifax 1900 (IV 30) | 3 | 200 | 6 | 2.0 | 90 | 3.0 | 140 |

COMPARATIVE EXAMPLE A 20 liters of a 5 wt.% suspension of Hostalen GUR 412 in decalin was metered into a glass flask. The suspension was deaerated and flushed with nitrogen, after which a stabilizer was added. The suspension was slowly stirred at 160° C. (<30 rpm) for about 2 hours. Subsequently, without stirring, the suspension was subjected to ageing at 160° C. for 2 hours.

The resulting solution was clearly non-homogeneous. In the processing of this solution via spinning (spinning aperture 1 mm), quenching in water, extraction with dichloromethane and stretching at 120° C., filaments were obtained which varied widely as to thickness, strechability, tensile strength and modulus.

COMPARATIVE EXAMPLE B

The process of example A was repeated, but now at a suspension volume of only 0.8 liters. The resulting solution was macroscopically homogeneous and could be transformed via the method described in example A into gel filaments with reasonable stretchability (max. 30×), upon which filaments with a tensile strength of 1–1.5 GPa and a modulus of 40–50 GPa were obtained.

These two comparative examples A and B show that on a larger scale, the production of homogeneous solutions via the customary stirring method is extremely difficult.

COMPARATIVE EXAMPLE C

A 5%-(wt) suspension of Hostalen GUR 412 in decalin was metered to a single-screw extruder type Gottfert GFT 015-1-01/04 with a diameter of 20 mm, an L/D ratio of 22, and having no intermediate mixing sections. Therein the suspension was transformed at 160°–170° C. at a speed of 30 rpm, to obtain an optically homogeneous solution.

However, the filaments thereby obtained via the spinning method described in Example A were extremely non-homogeneous and broke during stretching.

COMPARATIVE EXAMPLE D

The process of example C was repeated, however this time the solution from the extruder was subjected to an ageing process of 2-15 hours at 160° C. The stretchability of the gel filaments was now at most 40×, while the filaments obatined had a tensile strength of about 2 GPa and a modulus of about 60 GPa.

These two comparative examples C and D show that the production of a really homogeneous solution in an extruder not provided with both mixing and conveying parts is possible only by use of non-economic prolonged after-ageing stage.

As indicated by the foregoing examples according to this invention, the extruded products may be passed directly into a gaseous or liquid quenching medium, wherein the same are cooled almost instantaneously to below the gelling temperature. By this operation the extrudate is converted into the gel-state, and can then be further converted via stretching or drawing at high and even ultra-high stretch ratios, whether or not after removal of all or part of the solvent. Articles having a high tensile strength and modulus are thereby formed, for instance filaments, ribbons, bands, tapes, films, tubes, etc. It is, of course, also possible for the extrudate to be carried out directly from the extruder so as to be spread directly onto a solid cooled surface, for instance, a cooling roll, to thereby form, especially, a film-shaped gel article. Films may also be formed from extruded gel tubes by blowing the same, with mono- and/or bi-axial stretching.

The gel articles obtained in the present process can thus especially be used for conversion into filaments, fibers, bands, ribbons, tapes, films, tubes, etc. with a high tensile strength and a high modulus via stretching at preferably elevated temperature, whether or not after removal of all or part of the solvent.

It may also be an advantage for the gel products produced by the process of this invention to be subjected to irradiation, particularly electron radiation, before or during the stretching or drawing procedure, by which irradiation process improved novel products, especially having reduced creep and fibrillation characteristics are obtained.

We claim:

1. Process for the continuous preparation of homogeneous solutions up to 50 wt.% of high-molecular weight polymers which comprises forming a suspension of a finely divided high-molecular weight polymer in a suitable solvent or mixture of solvents, which solvent(s) is (are) liquid at room temperature, and processing said suspension through a screw extruder operated at a rotational speed of from about 30 to about 300 revolutions/minute, and equipped with alternate mixing and conveying sections, during such a required residence time (t) in the extruder that (t) expressed in minutes is at most 0.3 D, wherein D denotes the diameter of said extruder expressed in millimeters, at a temperature above the dissolution temperature of said polymer in said solvent(s) at the prevailing operating pressure, and employing a mixing and kneading treatment therein at a mechanical shear rate between about 30 and 2000 sec.$^{-1}$ whereby a homogeneous solution of said polymer is formed containing at least 50 wt.% of solvent.

2. Process according to claim 1, wherein the required residence time (t) in said extruder is at most (0.2×D) minutes.

3. Process according to claim 2, wherein said residence time is at most about 30 minutes.

4. Processing according to claim 1, wherein the said polymer is a linear polyethylene having a weight-average molecular weight of at least $4 \times 10^5$.

5. Process according to claim 4, wherein said molecular weight is at least $8 \times 10^5$.

6. Process according to claim 1, wherein the temperature of the suspension and the solution in said extruder is maintained within the range of 140° to 220° C.

7. Process according to claim 1, wherein said rotational speed is from about 150 to 300 rpm.

8. Process according to claim 1, wherein the polymer content of said suspension is from 1 to 40 wt.%.

9. Process according to claim 1, wherein said mechanical shear rate is from 100 to 300 sec.$^{-1}$.

10. Process according to claim 1, wherein the finely divided polymer and the solvent(s) are introduced into the extruder in separate feed streams and the suspension and the solution are both formed within the extruder.

11. A process for the continuous forming of highly stretchable gel filaments, tapes, tubes and films from suspensions of high molecular weight polymers which comprises processing a 1-50 wt. % suspension of a finely divided polymer in a suitable solvent or mixture of solvents which solvent(s) is (are) liquid at room temperature, through a screw extruder operated at a rotational speed of from 30 to about 300 r.p.m. and equipped with alternate mixing and conveying sections, during such a required residence time (t) in said extruder that (t) expressed in minutes is at most 0.3 D, wherein D denotes the diameter of said extruder expressed in millimeters, at a temperature above the dissolution point of said polymer in said solvent(s) and below the boiling point of the solvent(s) at the prevailing operating pressure, while employing a mixing and kneading treatment therein with a mechanical shear rate between about 30 and 2,000 sec.$^{-1}$, whereby a homogeneous solution containing at least 50 wt. % solvent is formed, and thereafter passing the thus-formed homogeneous solution out of the extruder thus obtained to below the gel-point to obtain a homogeneous gel filament, tape, film or tube, according to the configuration of the said orifice.

12. Process according to claim 11, wherein a gear pump is interposed between the exit of the extruder and the spinning orifice and said homogeneous solution is passed through said gear pump.

13. Process for the continuous preparation of homogeneous solutions up to 50 wt.% of high-molecular weight polymers which comprises forming a suspension of a finely divided high-molecular weight polymer in a suitable solvent or mixture of solvents, which solvent(s) is (are) liquid at room temperature, and processing said suspension through a co-rotation twin-screw extruder operated at a rotational speed of from about 30 to about 300 revolutions/minute, and equipped with alternate mixing and conveying sections, during such a required residence time (t) in the extruder that (t) expressed in minutes is at most 0.3 D, wherein D denotes the diameter of said extruder expressed in millimeters, at a temperature above the dissolution temperature of said polymer in said solvent(s) at the prevailing operating pressure, and employing a mixing and kneading treatment therein at a mechanical shear rate between about 30 and 2000 sec.$^{-1}$ whereby a homogeneous solution of said polymer is formed containing at least 50 wt. % of solvent.

14. The process of claim 11 wherein said screw extruder is a co-rotation twin-screw extruder.

* * * * *